(12) United States Patent
Geraets et al.

(10) Patent No.: US 8,839,947 B2
(45) Date of Patent: Sep. 23, 2014

(54) SYSTEM FOR CONVEYING BIOMASS FOR COLLECTION, TRANSPORT, OR PROCESSING

(71) Applicant: POET Research, Inc., Sioux Falls, SD (US)

(72) Inventors: James M. Geraets, Sioux Falls, SD (US); Mark D. Stowers, Sioux Falls, SD (US); Mark David Dilts, Sioux Falls, SD (US); Mark Herbert Heupel, Sioux Falls, SD (US)

(73) Assignee: POET Research, Inc., Sioux Falls, SD (US)

( * ) Notice: Subject to any disclaimer, the term of this patent is extended or adjusted under 35 U.S.C. 154(b) by 0 days.

(21) Appl. No.: 13/936,968

(22) Filed: Jul. 8, 2013

(65) Prior Publication Data

US 2013/0292231 A1 Nov. 7, 2013

Related U.S. Application Data

(62) Division of application No. 12/701,388, filed on Feb. 5, 2010, now Pat. No. 8,505,711.

(60) Provisional application No. 61/179,599, filed on May 19, 2009, provisional application No. 61/150,210, filed on Feb. 5, 2009.

(51) Int. Cl.
*B65G 31/04* (2006.01)
*B65G 33/10* (2006.01)
*C05F 17/02* (2006.01)
*A01D 87/10* (2006.01)

(52) U.S. Cl.
CPC ............... *B65G 33/10* (2013.01); *C05F 17/02* (2013.01); *A01D 87/10* (2013.01); *C05F 17/0241* (2013.01)

USPC ........... 198/642; 198/300; 198/513; 198/519; 198/671

(58) Field of Classification Search
CPC ........ B65G 47/94; B65G 47/34; B65G 31/04; B65G 2814/0288
USPC .................. 198/671, 642, 513, 519
See application file for complete search history.

(56) References Cited

U.S. PATENT DOCUMENTS 2,558,006 A * 6/1951 Shriver et al. ................ 198/671
2,772,764 A * 12/1956 McClellan ....................... 193/4

(Continued)

OTHER PUBLICATIONS

Office Action mailed Dec. 12, 2012 for U.S. Appl. No. 12/701,388, 6 pages.

(Continued)

*Primary Examiner* — Joseph Dillon, Jr.
(74) *Attorney, Agent, or Firm* — Amin, Turocy & Watson, LLP

(57) ABSTRACT

A system for conveying biomass is disclosed. The system is configured to convey biomass for collection, transport, or processing. The system comprises a housing comprising an opening configured for the entry of biomass, at least one shoe skid configured to offset the housing in a vertical orientation, an apparatus at least partially within the housing comprising at least one rotating blade assembly, and a conduit configured to discharge biomass from the housing so that biomass entering into the housing can be projected by the apparatus through the conduit for collection or transport. The system may comprise conduit that is extendable and has articulation segments for vertical movement. The system may comprise a housing that comprises a member to dislodge the biomass from a pile to flow into the opening. The system may comprise at least one shoe skid that comprises a large surface area and projects forward of the housing.

13 Claims, 16 Drawing Sheets

(56) References Cited

U.S. PATENT DOCUMENTS

| | | | | |
|---|---|---|---|---|
| 3,391,778 A | * | 7/1968 | Lasiter | 198/530 |
| 3,677,422 A | * | 7/1972 | Meyers et al. | 414/293 |
| 3,866,769 A | | 2/1975 | Morey et al. | |
| 3,907,139 A | * | 9/1975 | Luscombe | 100/100 |
| 3,944,098 A | | 3/1976 | Foote | |
| 3,964,492 A | | 6/1976 | Crego et al. | |
| 4,177,626 A | | 12/1979 | McNaught | |
| 4,288,933 A | | 9/1981 | Fair | |
| 4,346,527 A | | 8/1982 | Schmidt | |
| 4,477,989 A | * | 10/1984 | Vachon | 37/252 |
| 4,613,275 A | * | 9/1986 | Karlowsky | 414/489 |
| 4,896,970 A | | 1/1990 | Schuler | |
| 4,908,968 A | * | 3/1990 | Thorud et al. | 37/233 |
| 4,964,502 A | | 10/1990 | Buschbom | |
| 4,968,211 A | | 11/1990 | Compton | |
| 5,076,418 A | | 12/1991 | Tanis | |
| 5,083,978 A | * | 1/1992 | Royneberg | 460/149 |
| 5,092,453 A | | 3/1992 | Bruke | |
| 5,099,986 A | | 3/1992 | Kuzub | |
| 5,467,827 A | * | 11/1995 | McLoughlin | 169/24 |
| 5,725,160 A | | 3/1998 | Harper et al. | |
| 5,813,152 A | | 9/1998 | Weight | |
| 6,497,546 B2 | * | 12/2002 | Wood et al. | 414/523 |
| 6,811,020 B2 | | 11/2004 | Bailey | |
| 6,931,771 B1 | * | 8/2005 | Liebl | 37/260 |
| 6,938,364 B2 | | 9/2005 | White et al. | |
| 6,948,902 B2 | | 9/2005 | Hanig | |
| 6,971,324 B1 | * | 12/2005 | Beck | 111/200 |
| 7,191,889 B1 | | 3/2007 | Heley | |
| 7,461,737 B2 | | 12/2008 | Dutschke | |
| 7,644,816 B2 | * | 1/2010 | Veiga Leal et al. | 198/671 |
| 7,861,851 B2 | | 1/2011 | Dekoning | |
| 7,938,613 B2 | * | 5/2011 | Yoder et al. | 414/518 |
| 8,065,823 B2 | | 11/2011 | Morrell | |
| 2001/0026755 A1 | * | 10/2001 | Wood et al. | 414/523 |
| 2007/0022639 A1 | * | 2/2007 | Sueshige et al. | 37/260 |

OTHER PUBLICATIONS

Office Action mailed Jul. 18, 2012 for U.S. Appl. No. 12/701,388, 13 pages.

* cited by examiner

SYSTEM FOR CONVEYING BIOMASS FOR COLLECTION, TRANSPORT, OR PROCESSING

CROSS-REFERENCE

This application is a divisional of U.S. patent application Ser. No. 12/701,388, filed Feb. 5, 2010, and entitled "SYSTEM FOR CONVEYING BIOMASS FOR COLLECTION, TRANSPORT, OR PROCESSING", which claims the benefit of (a) U.S. Provisional Patent Application Ser. No. 61/150,210, filed Feb. 5, 2009, entitled "BIOMASS COLLECTING SYSTEM", and (b) U.S. Provisional Patent Application No. 61/179,599, filed May 19, 2009, and entitled "BIOMASS CONVEYING SYSTEM". The entireties of the aforementioned applications are expressly incorporated herein by reference

FIELD

The present application relates to a system for conveying biomass for collection, transport, or processing. The present invention also relates to an apparatus to create and move piles of biomass.

BACKGROUND

Biomass comprises plant matter that can be suitable for direct use as a fuel/energy source or as a feedstock for processing into another bioproduct (e.g., a biofuel such as cellulosic ethanol) produced at a biorefinery (such as an ethanol plant). Biomass may comprise, for example, corncobs and stover (e.g., stalks and leaves) made available during or after harvesting of the corn kernels. In order to be used or processed, biomass will be harvested and collected from the field and transported to the location where it is to be used or processed. It is known to collect biomass (such as corncobs and stover) in bales in the field or in piles at the edge of the field. The bales or piles of biomass are then collected and transported from the field to the location of intended use or processing. To form the biomass into bales may require additional specialized equipment (such as a baler) that is not required to form the biomass into piles in the field. With such known equipment, conveyance of biomass that is harvested into bales may generally be more efficient or convenient than conveyance of piles (e.g., loose piles of plant material).

The difficulty or efficiency of the collection and transport operation for biomass will depend upon, among other things, the type and form of the biomass that is collected. Biomass stored in piles at the edge of the field can be collected using a conventional loader. Collection with a conventional loader might be inefficient since the conventional loader is sensitive to the skills of the operator. Conventional loaders or conveyor designs may also produce piles having uneven profiles. These uneven profiles can have ridges or edges that trap moisture, which could affect the biomass. Piles of biomass may contain foreign matter such as rocks or metallic parts shed by the harvest machinery which can cause stoppages or equipment damage to conventional loaders or other equipment used to move the biomass from the piles.

It would be advantageous to provide for a system to convey biomass for collection and transport to a biorefinery. It would also be advantageous to provide for a system to convey biomass for collection and processing at a biorefinery. It would further be advantageous to provide for a system to convey biomass that can achieve enhanced efficiency in the collection of biomass that has been harvested or stored into piles or a similar form.

SUMMARY

The present invention relates to a system for conveying biomass for collection and transport. The system comprises a housing comprising an opening configured for entry of the biomass and at least one shoe skid configured to offset the housing in a vertical orientation. The system also comprises an apparatus at least partially within the housing comprising at least one rotating blade assembly. Also included in system is a conduit configured to discharge the biomass from the housing so that the biomass entering into the housing can be projected by the apparatus through the conduit for collection or transport. The conduit is extendable and comprises articulation segments for vertical movement.

The present invention also relates to a system for conveying biomass for collection and transport. The system comprises a housing comprising an opening configured for entry of the biomass and at least one shoe skid configured to offset the housing in a vertical orientation. The system also comprises an apparatus at least partially within the housing comprising at least one rotating blade assembly. System also comprises a conduit configured to discharge the biomass from the housing so that the biomass entering into the housing can be projected by the apparatus through the conduit for collection or transport. The housing further comprises a member configured to engage the biomass to be drawn into the opening of the housing to facilitate a flow of biomass into the housing and through the conduit.

The present invention further relates to a system for conveying biomass for collection and transport. The system comprises a housing comprising an opening configured for entry of the biomass and at least one shoe skid configured to offset the housing in a vertical orientation. The system also comprises an apparatus at least partially within the housing comprising at least one rotating blade assembly and a conduit configured to discharge the biomass from the housing so that the biomass entering into the housing can be projected by the apparatus through the conduit for collection or transport. The at least one shoe skid comprises a large surface area and projects forward of the housing.

DESCRIPTION OF THE EMBODIMENTS

Referring to FIGS. 1-20, exemplary embodiments of a system for conveying biomass for collection, transport or processing are shown. As shown, the system can be configured or adapted to operate either integrated with or as a separate part of various other types of machinery (e.g. tractors, front-end loaders, utility vehicles, land movers, plows, snow blowers or other snow removal equipment, etc.).

Figure 1:
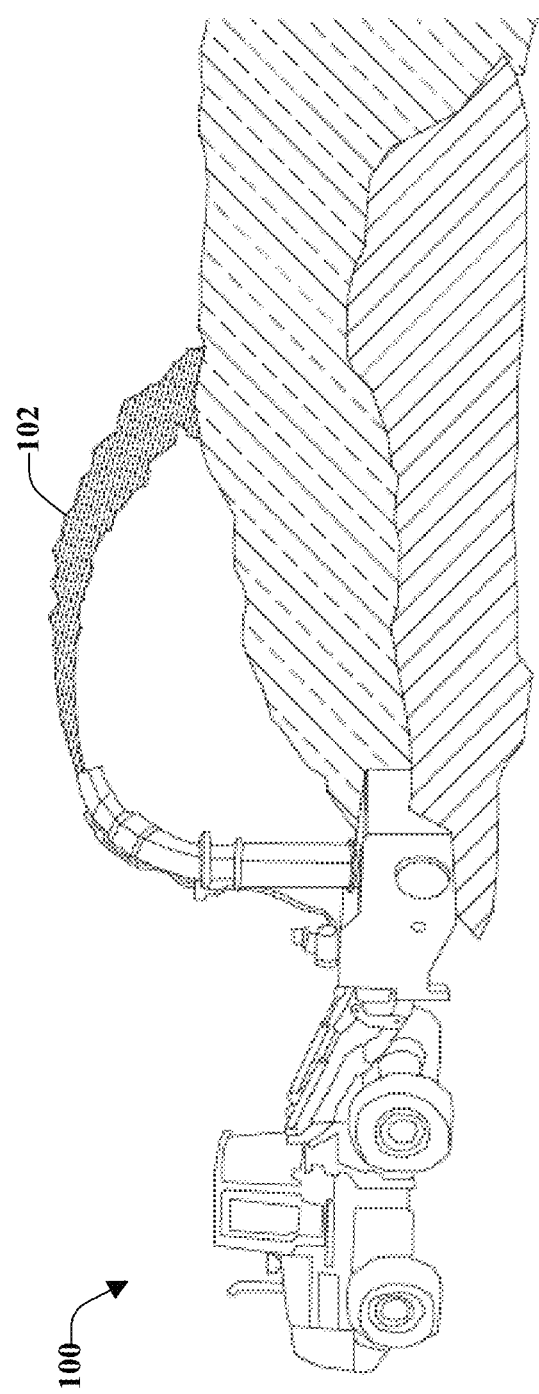
FIG. 1 is a perspective view of a system for conveying biomass for collection and transport according to an exemplary embodiment.

FIG. 1 is a perspective view of a system 100 for conveying biomass 102 for collection and transport according to an exemplary embodiment. The system 100 is configured to convey biomass for collection, transport, or processing. The system 100 comprises a housing comprising an opening configured for the entry of biomass and at least one shoe skid configured to offset the housing in a vertical orientation. The system 100 also comprises an apparatus at least partially within the housing comprising at least one rotating blade assembly and a conduit configured to discharge biomass from the housing so that biomass entering into the housing can be projected by the apparatus through the conduit for collection or transport.

According to an exemplary embodiment, the system is intended to enhance efficiency of the conveyance of biomass. The system may comprise modifications to the design of a conventional snow blower, such as the snow blower shown in U.S. Pat. No. 4,288,933, which is incorporated by reference. The system can be worked into a snow blower or worked into other equipment such as a front end loader or a tractor, for example.

The system is configured to (among other things) form a pile of biomass in the field or at other locations. The system can load biomass into a transport container or can load/convey biomass from a pile or from a different location into a transport container. The system can recover biomass that has been "spilled" or not picked up/loaded as intended by another system and can put the biomass into a pile or other intended place (e.g., bin or conveyor at a biorefinery). The system attempts to improve biomass material quality through particle size reduction.

Figure 2:
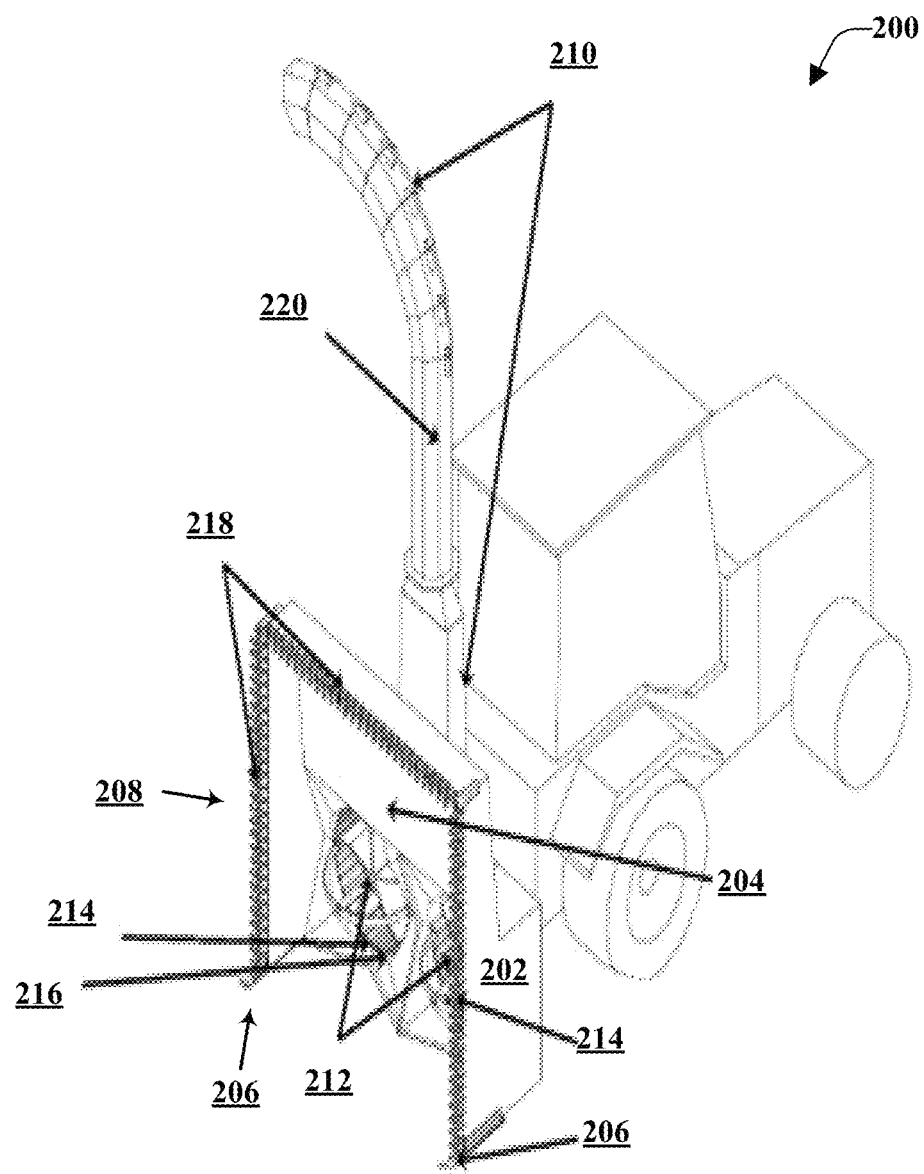
FIG. 2 is a schematic orthogonal view of a system for conveying biomass for collection, transport, or processing.

FIG. 2 is schematic orthogonal view of a system 200 according to an exemplary embodiment. A snow blower design can be reconfigured to create system 200. The snow blower design is particularly preferred for conveying biomass due to several attributes of the snow blower. For example, a snow blower may have to contend with chunks of ice that could resemble rocks and may come into contact with stones or gravel when used on gravel drives or roads. The snow blower has a relatively simple design (with fewer moving parts), can have greater reliability, may tend to have relative lower power consumption, and generally has a higher capacity through continuous processing. With snow, snow blower designs can be rated for 2000 tons/hour which can be for ideal conditions with a large amount of material.

System 200 provides a modified technical solution over a snow blower by increasing throughput capacity in order to process corncobs. Biomass quality may also be changed with system 200 by mitigation of dirt ingestion and incorporation of features that reduce particle size which can increase material density.

System 200 comprises a housing 202 that substantially encloses or covers moving parts. A front side of housing 202 comprises an opening 204 that functions as an intake for biomass. The biomass from a pile or another location enters housing 202 though opening 204. Opening 204 has a clearance that facilitates entry of the system 200 into the cob pile. Some snow blowers have difficulty entering into a cob pile larger than the opening of the snow blower. An opening of a snow blower housing design has been enlarged to create opening 204 of system 200. For example, an operator can engage system 200 into a pile of biomass by inserting housing 202 at least partially into the pile of biomass. Biomass that is in contact with housing 202 can enter system 200 through opening 204.

Attached to housing 202 is a member in the form of a skid, shown as a shoe skid 206. The at least one shoe skid 206 is adapted to provide a configurable offset between housing 202 and the ground to mitigate dirt ingestion into system 200 (through opening 204). According to an embodiment, the shoe skids comprise a large surface area and project forward of the housing. In a particularly preferred embodiment, the use of wider shoe skids offsets housing 202 from the ground and minimizes dirt ingestion (through opening 204) while conveying cobs from a cob pile. In accordance with an embodiment, the shoe skids are attached to the housing to enable non labor-intensive skid orientation changes to minimize contact with dirt. According to an embodiment, the shoe skids are attached to the housing with bolts. According to an alternative embodiment, the shoe skids can be attached to the housing by another attachment means such as fasteners, brazing, or welding.

Housing 202 substantially encases an apparatus comprising at least one rotating blade assembly. The rotating blade assembly can comprise one or more rotating blowers 208 (two rotating blowers are shown) that simultaneously dislodge corncob (cobs) from a pile and impart sufficient energy for the cobs to be projected through a conduit. The conduit is shown in the form of a discharge spout 210. According to an embodiment, the conduit is a single discharge spout that controls a direction of projection for the biomass. A single discharge spout can control a projection direction of the biomass better than dual discharge spouts. A rotary speed of the rotating blowers is modified and optimized for conveying biomass. Located on rotating blowers 208 are impellers that comprise impeller blades 212 that provide dislodge and projection functions. A number and design of the impeller blades is modified as compared to a snow blower in order to contact and throw corncobs. Cobs enter impeller blades 212 axially and are thrown tangentially out discharge spout 210. The perimeter of the impeller blades may be equipped with a number of geometric or surface treatments, such as modified surfaces 214 and inserts 216 (shown installed), to reduce power consumption or shear the cobs and thus reduce their particle size. According to an embodiment, the inserts are annular metal inserts that reduce and densify the material. According to another embodiment, the inserts are removable inserts.

A leading edge of housing 202 can be substantially covered with a member, shown in the form of rotating breaker bars 218. Member or rotating breaker bars 218 can dislodge cobs ahead of the impeller blades which can allow system 200 to enter farther into the cob pile. In accordance with an aspect, the member is configured to engage the biomass to be drawn into the opening of the housing to facilitate a flow of biomass into the housing and through the conduit. The member can comprise at least one breaker bar. According to an embodiment, the member comprises a mechanism coupled to the housing. According to another embodiment, the mechanism comprises at least one bar having a rotating element. The rotating element comprises an auger, according to an embodiment. According to another embodiment, the at least one bar is located at a top of the opening and in a substantially horizontal orientation. According to another embodiment, the member comprises a first bar in a substantially vertical orientation and a second bar in a substantially horizontal orientation.

Figure 3:
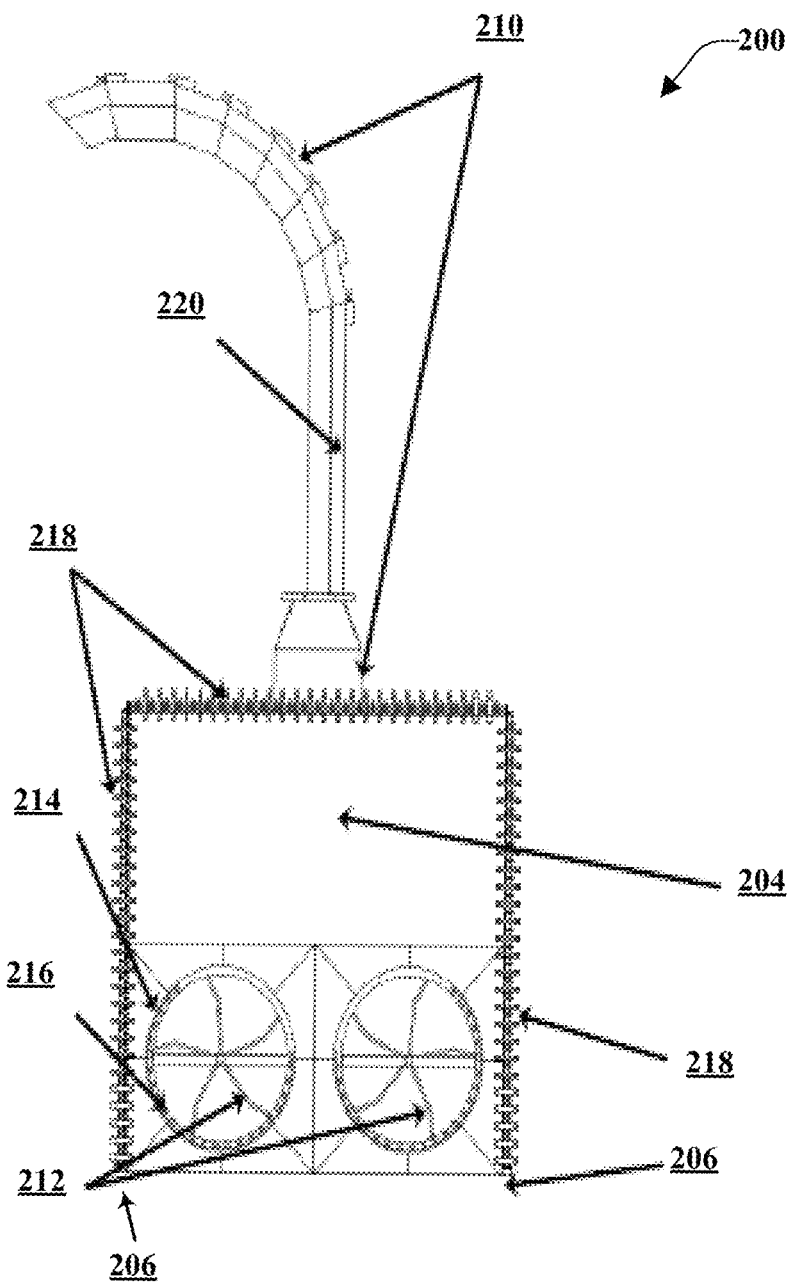
FIG. 3 is a schematic front elevation view of the system.

A design of discharge spout 210 (inlet size, diameter, length, degree of articulation) is modified for biomass. Discharge spout 210 can have a length that is extended as compared to a snow blower discharge spout. For example, a length of the discharge spout can be extended in order to have an increased height to project the biomass into a bin or transport container elevated from the ground. According to an embodiment, the discharge spout of the system has numerous sections that are joined together. The numerous sections can enable the discharge spout to articulate sufficiently through operator adjustments such that cobs may be unloaded to a desired location (e.g., into a trailer) more accurately. According to some embodiments, discharge spout 210 can include internal surface treatments 220 (hidden) as indicated within discharge spout 210. According to an embodiment, internal surface treatments comprise low friction material or low friction surfaces. According to some embodiments, an optional camera system can be connected to the discharge spout. FIG. 3 is a schematic front elevation view of the system 200 of the present invention.

Figure 4:
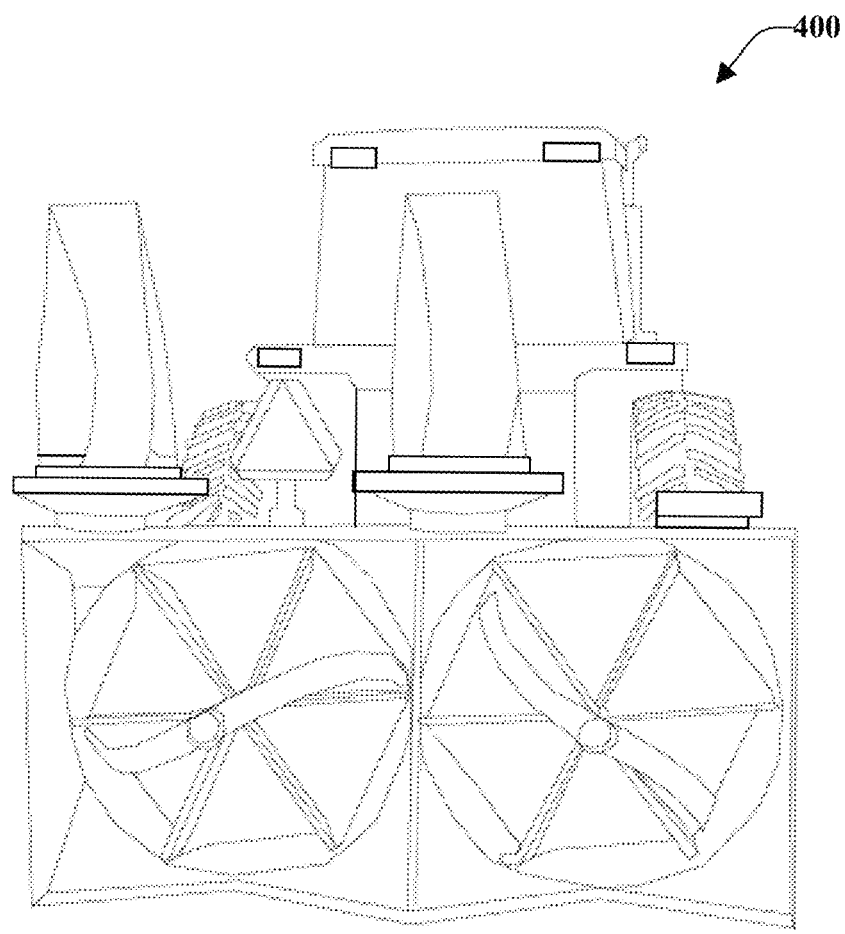
FIG. 4 is an example of a snow blower that can be modified for the conveyance of biomass.

The system 200 can be a snow blower reconfigured to allow biomass to be collected, transported, and processed. An example of a snow blower 400 that can be modified for the conveyance of biomass is illustrated in FIG. 4.

Figure 5:
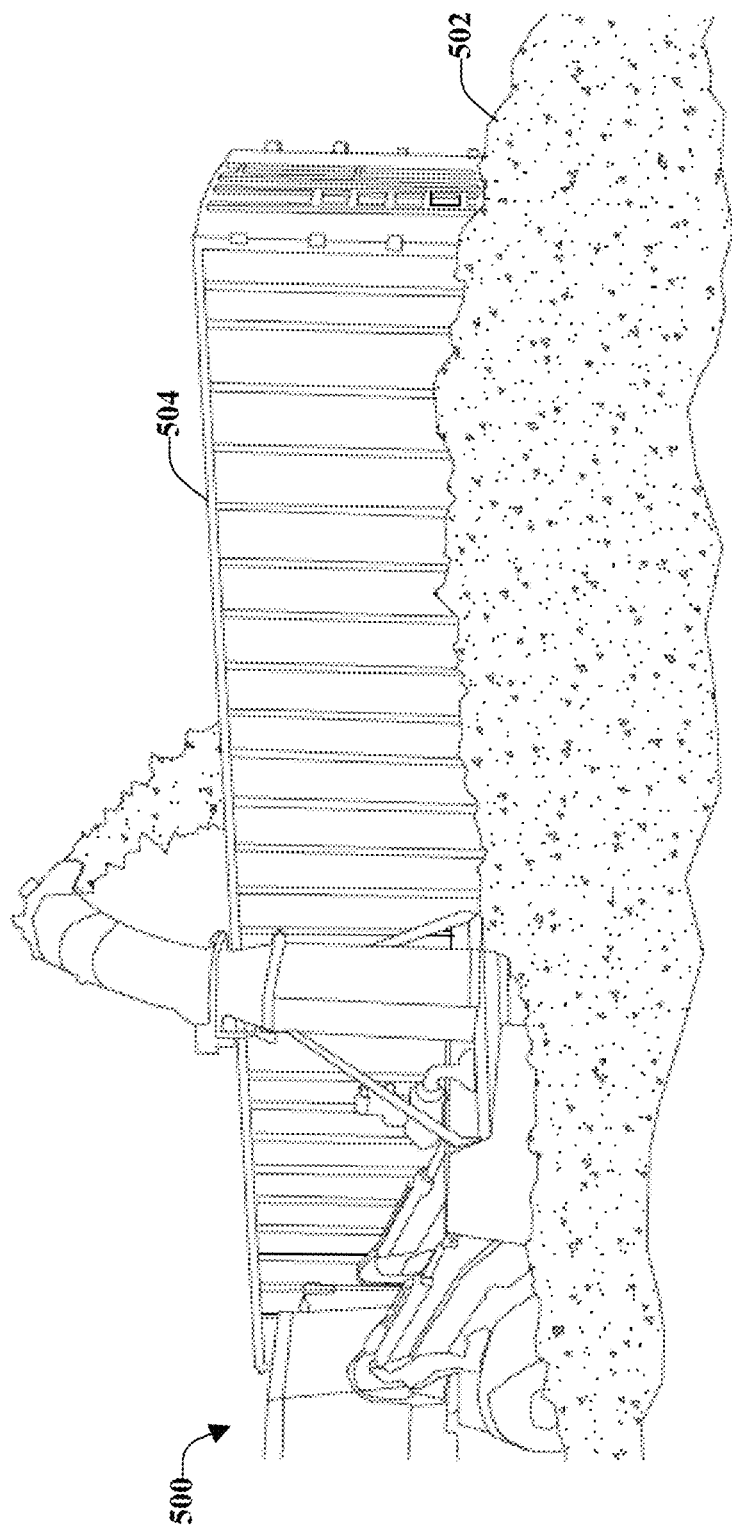
FIG. 5 is an example of a system that moves biomass from a pile and propels the biomass to a trailer.

For example, system can collect biomass, such as from a field, and create piles or rows of biomass. System can move the biomass from the piles or rows and convey or throw the biomass into a vehicle for transport to another location. As shown in FIG. 5 a system 500 can take biomass from a pile 502 and propel the biomass to a trailer 504. In a biorefinery environment, the system can move the biomass from a vehicle or bin onto a conveyor system for processing of the biomass.

Figure 6:
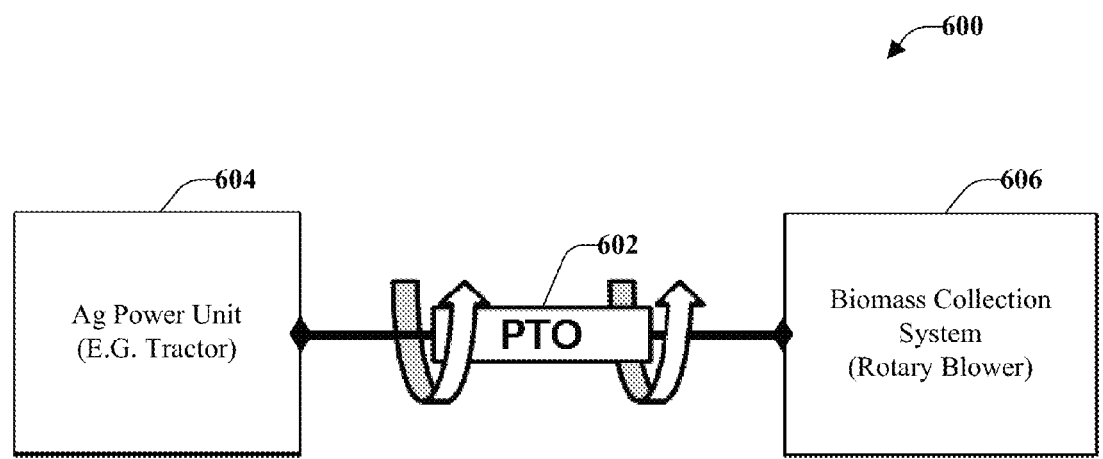
FIG. 6 is a schematic system block diagram illustrating an integration of the system with an agriculture power unit.

FIG. 6 is a schematic system block diagram 600 illustrating an integration of a system with an agriculture power unit according to an embodiment. A power take off (PTO) 602 is shown connected to an agricultural power unit 604 such as a tractor. The PTO 602 is also shown connected to a system 606 such as a rotary blower. According to an embodiment, system 606 can be powered by other means, including self-powering means, (e.g., hydraulic power, electric power).

Figure 7:
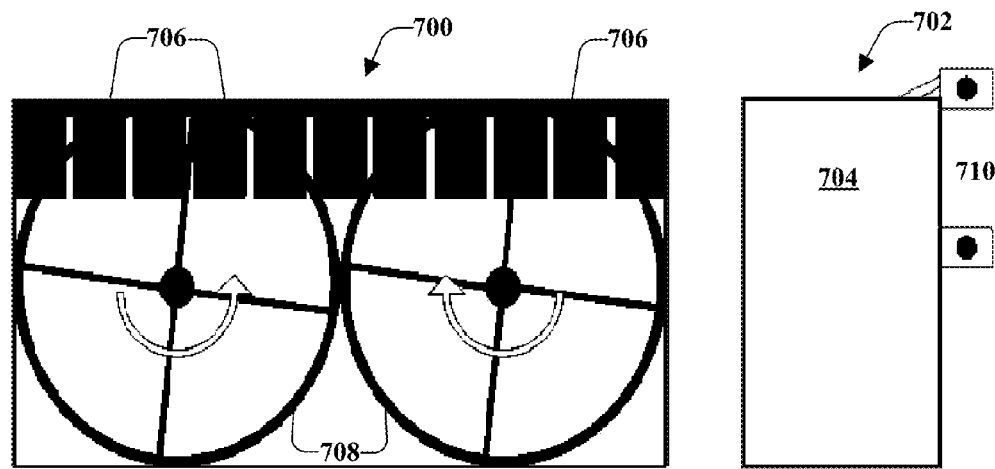
FIG. 7 is a front elevation view and a side elevation view of a snow blower housing design.

A front elevation view 700 and a side elevation view 702 of a snow blower housing design are show in FIG. 7. In some snow blower designs, a housing 704 is approximately four feet tall and has steel hinged flaps 706 which can limit the ability of cobs to flow into rotors 708. A connection (hook-up) to a tractor is illustrated at 710.

Figure 8:
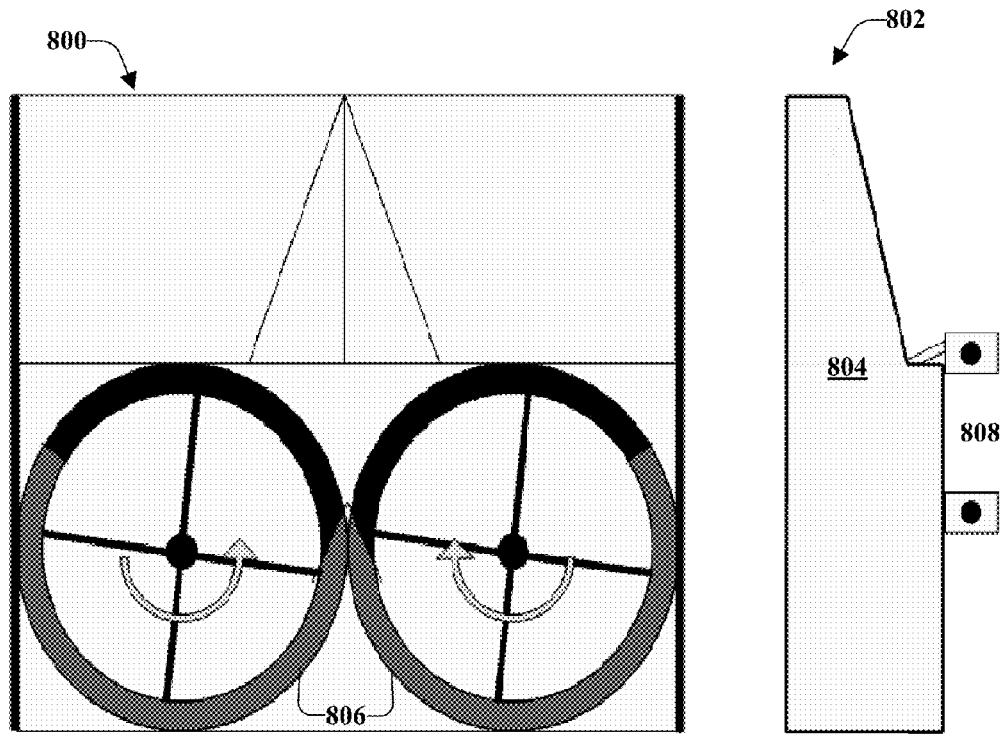
FIG. 8 is a front elevation view and a side elevation view of a housing design of the system of the present invention.

FIG. 8 is a front elevation view 800 and a side elevation view 802 of a housing design of a system of the present invention. Housing 804 is modified for the addition of extra height to allow cobs stored in large piles to contact the rotating blowers 806 (or impeller blades). For example, an extra height of the housing can allow cobs to fall into the rotors. According to an embodiment, the housing has a width of at least 9 feet to allow a large amount of material to enter the housing. According to an embodiment, the housing has a width of about 9-12 feet. A connection (hook-up) to a tractor is illustrated at 808.

Figure 9:
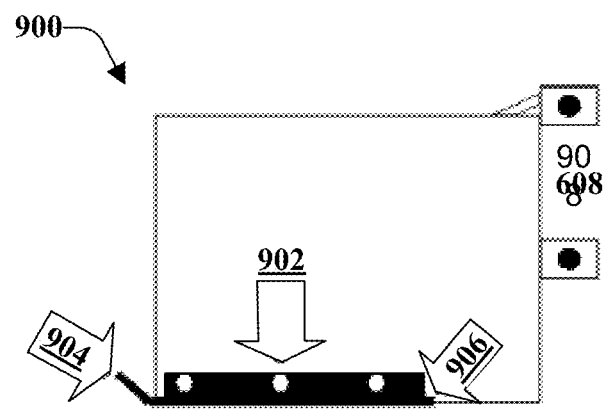
FIG. 9 is a side elevation view of a system design.

A side elevation view 900 of a system design according to an embodiment is shown in FIG. 9. The side elevation view 900 of the system illustrates a modified snow blower structure showing elements of the present invention. The modified structure includes bolt on shoe skids 902. Bolt on shoe skids 902 may include a forward projection 904 that extends outward from the housing. The forward projection 904 can help to project the system into a cob pile further than a snow blower can be projected into the cob pile. Bolt on shoe skids 902 may also have a larger surface area 906 than shoe skids associated with a snow blower. A connection (hook-up) to a tractor is illustrated at 908.

Figure 10:
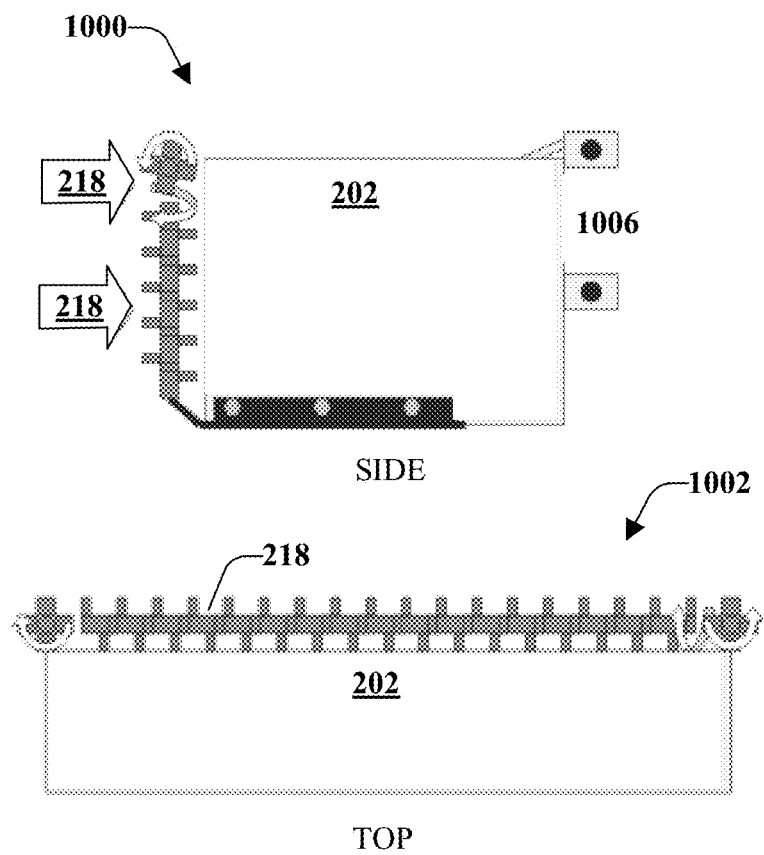
FIG. 10 is a side elevation view and a top view of the system design.

FIG. 10 is a side elevation view 1000 and a top view 1002 of a system design of the present invention. According to a preferred embodiment shown in FIGS. 2 and 10, housing 202 is provided with an apparatus in the form of a mechanism shown as breaker bar 218 intended to facilitate the engagement and flow of biomass material (e.g. from a pile) into housing 202. Breaker bar 218 can be located across a top of the housing 202. Breaker bar 218 can auger the biomass material to the center of the entire housing or to the center of each blower in order to attempt to increase the flow of the biomass material into the blower. According to another embodiment, the breaker bar across the top of the housing can be hinged to assist in breaking up the biomass material in the pile to increase the amount of biomass material being fed into the blower. According to another embodiment, breaker bars of a larger diameter could be used to help increase the ability to pull the biomass material into the blower. According to an alternative embodiment, the mechanism may comprise auger type breaker bars that feed the biomass material to the center of the housing or to the center of the individual blower(s). The mechanism may also comprise an articulating breaker bar which can move up into the pile to further facilitate the feed of the material into the blower.

Rotating breaker bars 1004 are employed to dislodge cobs ahead of the housing. The rotating action of the breaker bars 1004 acts to dislodge cobs ahead of the oncoming rotating blowers which can allow for easier entry of the system into a pile of biomass (cob pile). Although the rotating breaker bars 1004 are illustrated as having a certain diameter, the actual size may be larger or smaller to optimize the dislodging of the cobs. A connection (hook-up) to a tractor is illustrated at 1006.

Figure 11:
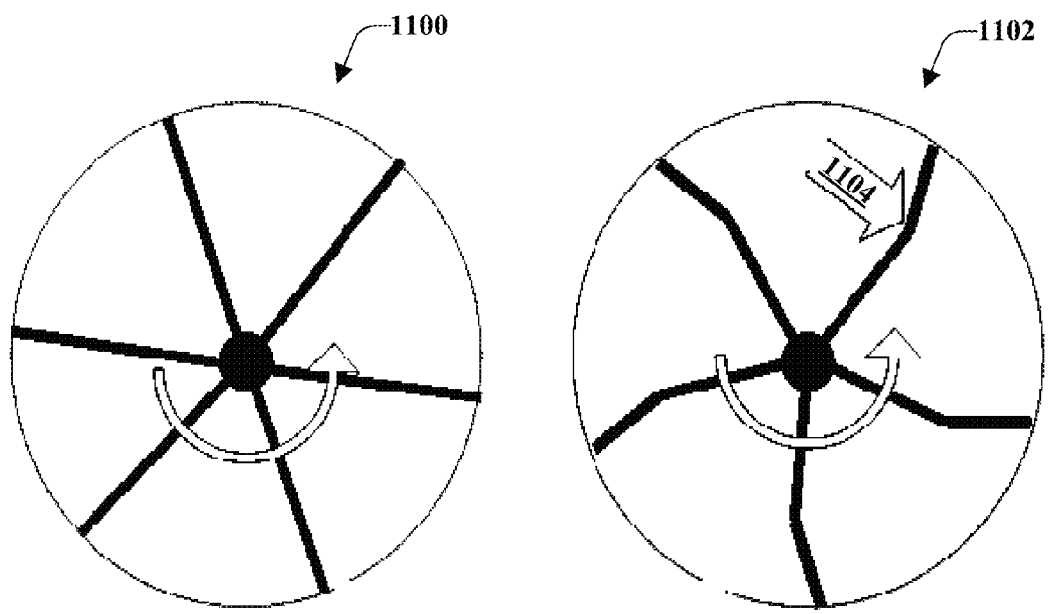
FIG. 11 is a front elevation view comparing impeller blades of a snow blower with impeller blades of the system of the present invention.

A front elevation view comparing impeller blades 1100 of a snow blower with impeller blades 1102 of a system of the present invention is shown in FIG. 11. Impeller blades 1102 were modified from impeller blades 1100. Impeller blades 1102 include cups 1104 in an attempt to propel biomass. Cups 1104 can improve contact with cobs during rotation and can increase velocity of the cobs exiting though a discharge spout.

Figure 12:
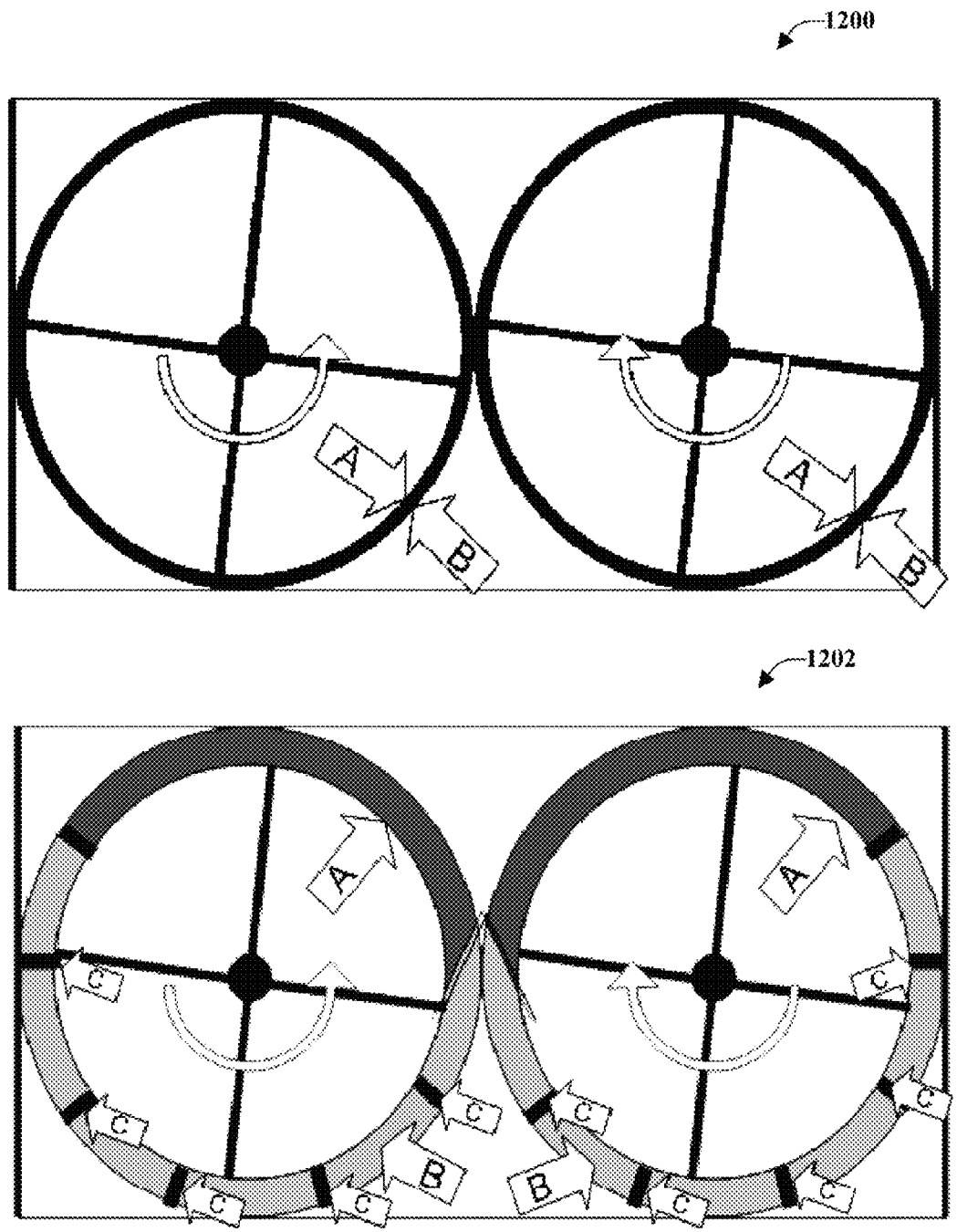
FIG. 12 is a comparison of a front elevation view of rotor clearance in a snow blower with a front elevation view of rotor clearance of the system of the present invention.

FIG. 12 is a comparison of a front elevation view 1200 of rotor clearance in a snow blower with a front elevation view 1202 of rotor clearance of a system of the present invention. Front elevation view 1200 illustrates rotor clearance (A) and (B) in a snow blower. Front elevation view 1202 of rotor clearance of the system illustrates the modifications made to the snow blower design. The modifications include a larger clearance between rotors and housings (A) which provides room for inserts (B). The inserts allow features such as shear surfaces to reduce particle size of the biomass. According to a particularly preferred embodiment, each insert comprises a plurality of shear surfaces (C).

Figure 13:
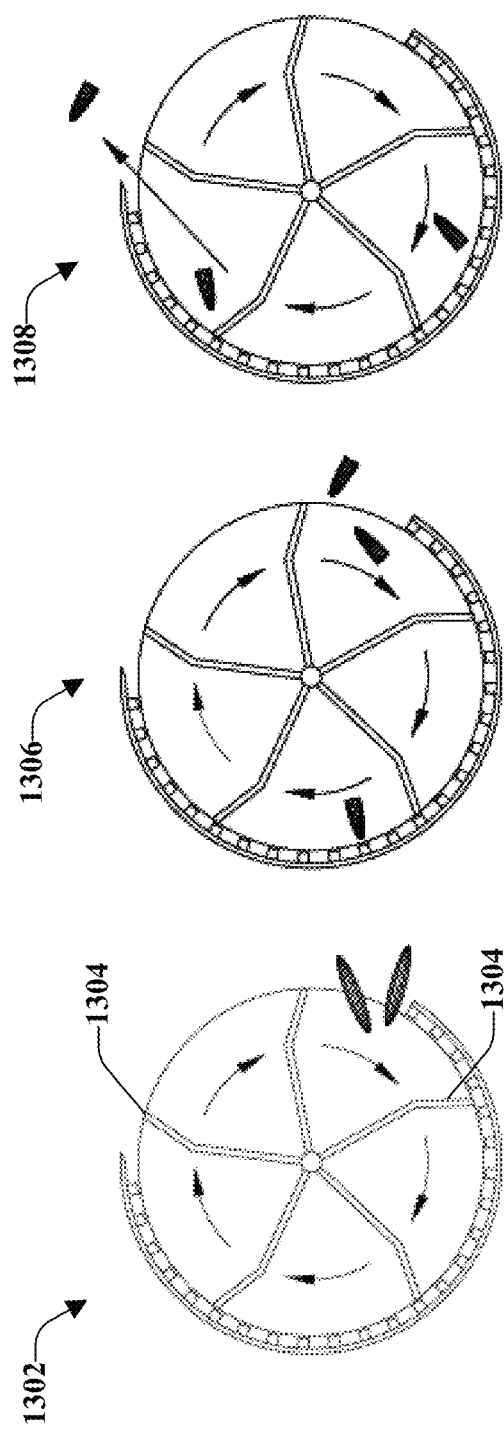
FIG. 13 is schematic front elevation views of impellers of the system.

Schematic front elevation views of impellers 1300 of a system according to an embodiment are shown in FIG. 13. The first diagram 1302 shows a particle path through impeller blades 1304 where particles enter the impeller axially. The second diagram 1306 shows shearing of the particles between the impeller blades 1304 and insert bars. The third diagram 1308 shows the discharge of particles (to the outlet or discharge spout) at a high velocity. The particles can be thrown tangentially out the discharge spout.

In a preferred embodiment, the present invention includes a modified number and design of impeller blades specifically designed to contact and throw corncobs. The design shown in FIG. 13 is intended to improve contact with corncobs during rotation and increases velocity of the thrown cobs. Bolt-on impeller surfaces can facilitate quick changes to orientation and quantity of impeller blades. The impeller surfaces may be attached to the system with any suitable attachment means and are not limited to bolts.

The rotary speed of a snow blower was optimized for biomass in a particularly preferred embodiment. An adapted revolution per minute (RPM) speed was based on density and flow characteristics of cobs. For snow, one manufacturer recommends 1000 RPM PTO speed which produces 350 RPM rotor speed on the blower. A PTO connection to an agriculture power unit is only one example of the way the system may be powered (as shown in FIG. 6). The system may also receive power from another source, one example of which is hydraulic power.

Figure 14:
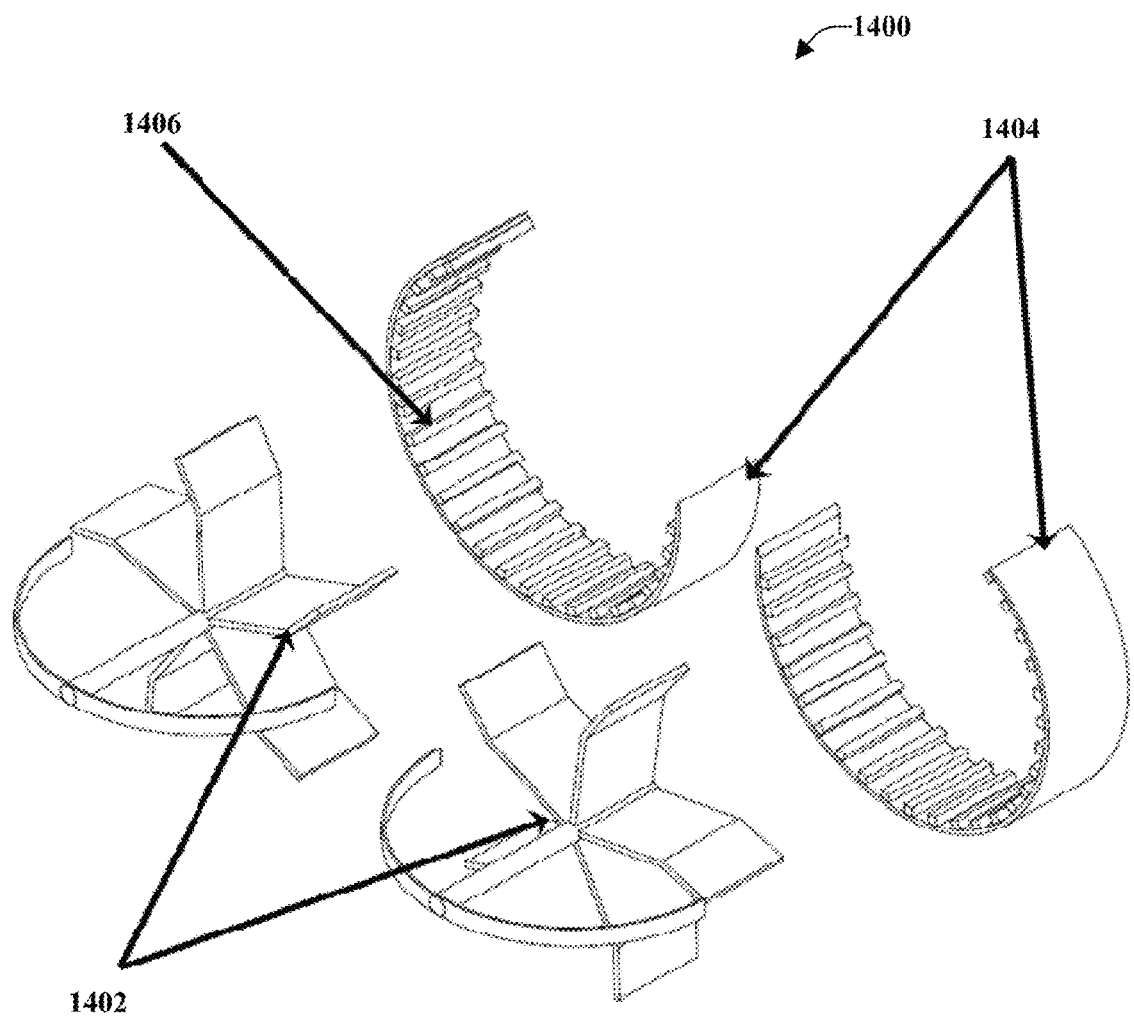
FIG. 14 is a schematic exploded orthogonal view of an orientation and relationship of impeller blades and annular metal inserts of the system.

FIG. 14 is a schematic exploded orthogonal view 1400 of an orientation and relationship of impeller blades 1402 and annular metal inserts 1404 of a system according to an embodiment. The annular metal inserts 1404 can have modified surfaces 1406 that can be inserted in the perimeter of the impellers. The annular metal inserts 1404 may include surface features which reduce cob particle size. In an embodiment, the surface features comprise shear surfaces. Surface features of the annular metal inserts 1404 that come in contact with the material (corncobs) act to shear the material and reduce particle size. The use of the surface features of the annular metal inserts 1404 results in a higher density material with a reduced particle size.

A conventional 8.5 foot wide snow blower employs two 49 inch diameter rotors in approximately 50 inch housings. According to the system of the present invention, modifications are made to the rotors so that less than 1.5 inches of clearance remain on all sides of the rotor. The extra room is provided to install different inserts incorporating surface features for shearing. In one embodiment, additional clearance can also be obtained for installing larger shearing features using the 46 inch impellers from an 8 foot snow blower.

Figure 15:
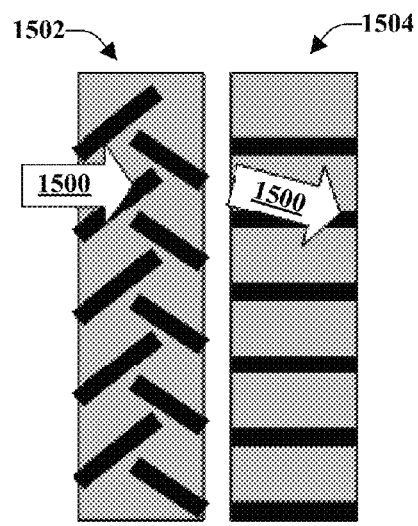
FIG. 15 is a top view of two embodiments of annular metal inserts for impellers of the system.

FIG. 15 is a top view of two embodiments of annular metal inserts for impellers of the system according to an embodiment. A "self cleaning" style 1502 and another possible orientation 1504 are shown. According to a preferred embodiment, the system is constructed to facilitate the through-flow of material and to reduce the accumulation of portions of material within the system (i.e. to be "self-cleaning" insofar as the frequency of cleaning and service to maintain the system in operation can be reduced). Other orientations are possible and can be utilized with the system.

Figure 16:
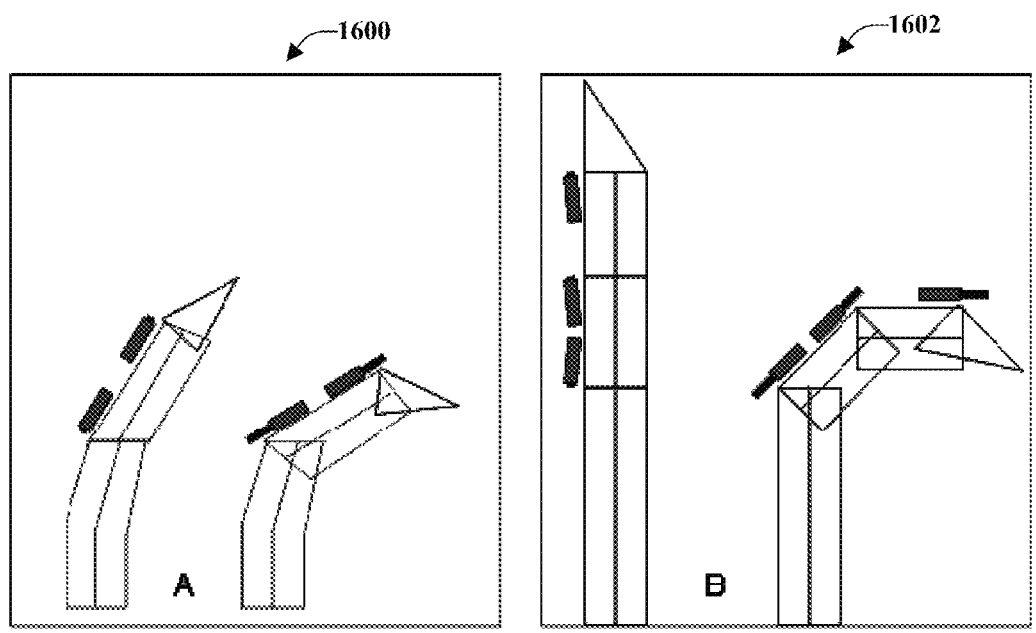
FIG. 16 is a side elevation view showing articulation of a discharge spout of a snow blower and an articulation of a discharge spout of the system of the present invention.

FIG. 16 is a side elevation view showing articulation 1600 of a discharge spout of a snow blower and articulation 1602 of a discharge spout of a system of the present invention. The articulation 1602 of the discharge spout is increased (as compared to articulation 1600). Increased articulation allows vertical movement or vertical orientation of the discharge spout for blowing biomass onto a pile as well as at least 135 degrees from the vertical for truck loading.

Figure 17:
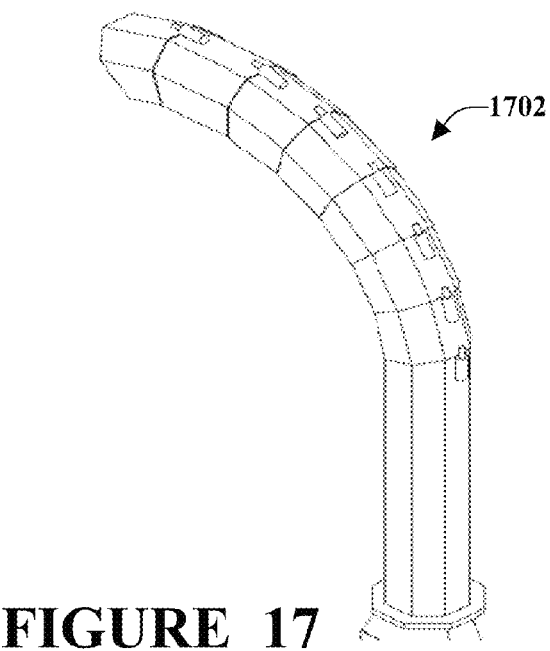
FIG. 17 is a schematic orthogonal view of an extendable discharge spout of the system.

A schematic orthogonal view of an extendable discharge spout 1702 of a system according to an embodiment is shown in FIG. 17. In a preferred embodiment, the discharge spout is extended in length in order that the spout reaches into a truck, the typical height of which is 13 feet 6 inches. The discharge spout is shown with a full length clean-out door in case of plugging. The discharge spout can comprise a plurality of articulation segments for vertical orientation or vertical movement of the discharge spout.

Because snow blower designs are generally not optimized for creating large piles and do not allow a great enough vertical trajectory to create the large piles, additional modifications were required. To achieve increased vertical trajectory, changes to the geometry of a snow blower discharge spout were made, as illustrated in FIG. 17. An additional hydraulic cylinder and discharge spout section can be added to achieve the ability to load trucks. Additional hydraulic cylinders and discharge spout sections may be added to increase articulation and height. The speed and capability of the blowers may limit the maximum height of the discharge spout design.

Figure 18:
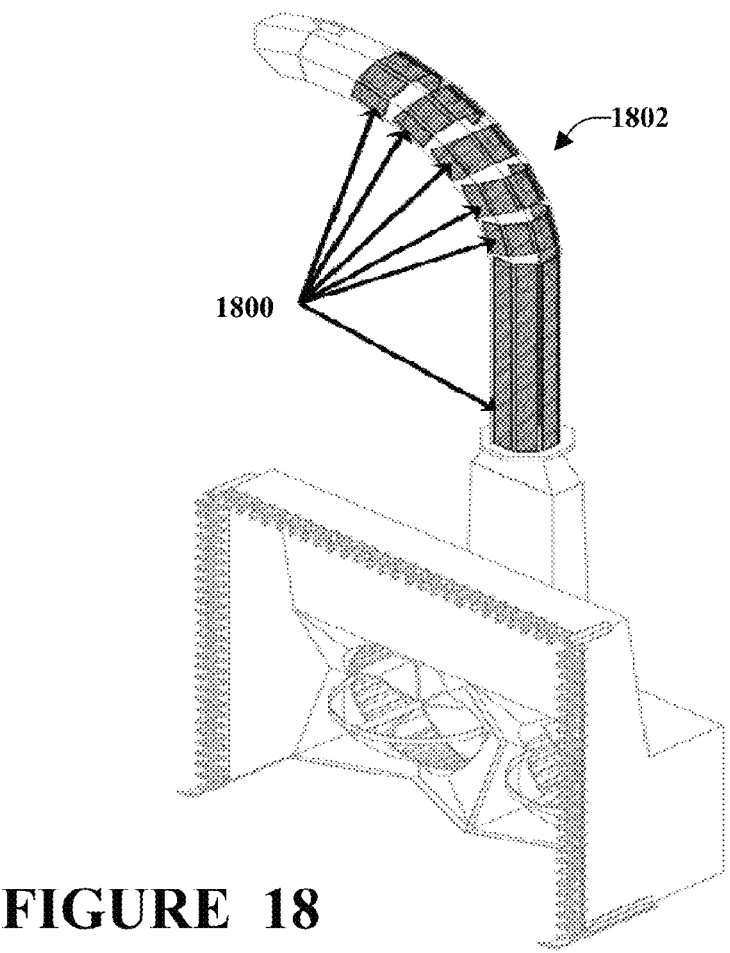
FIG. 18 is a schematic orthogonal view showing surface treatments located inside a discharge spout of the system.

FIG. 18 is schematic orthogonal view showing surface treatments 1800 located inside a discharge spout 1802 of a system according to an embodiment. In a preferred embodiment, the addition of surface treatments 1800 within the discharge spout 1802 helps to mitigate wear on the surfaces of the discharge spout 1802. The surface treatments can be placed in the discharge spout or on any internal surface where contact with the flowing material (corncobs) occurs to reduce friction and increase throughput of material through the discharge spout. According to a preferred embodiment, the surface treatments comprise low-friction material. According to an embodiment, the surface treatments are plastic material.

Figure 19:
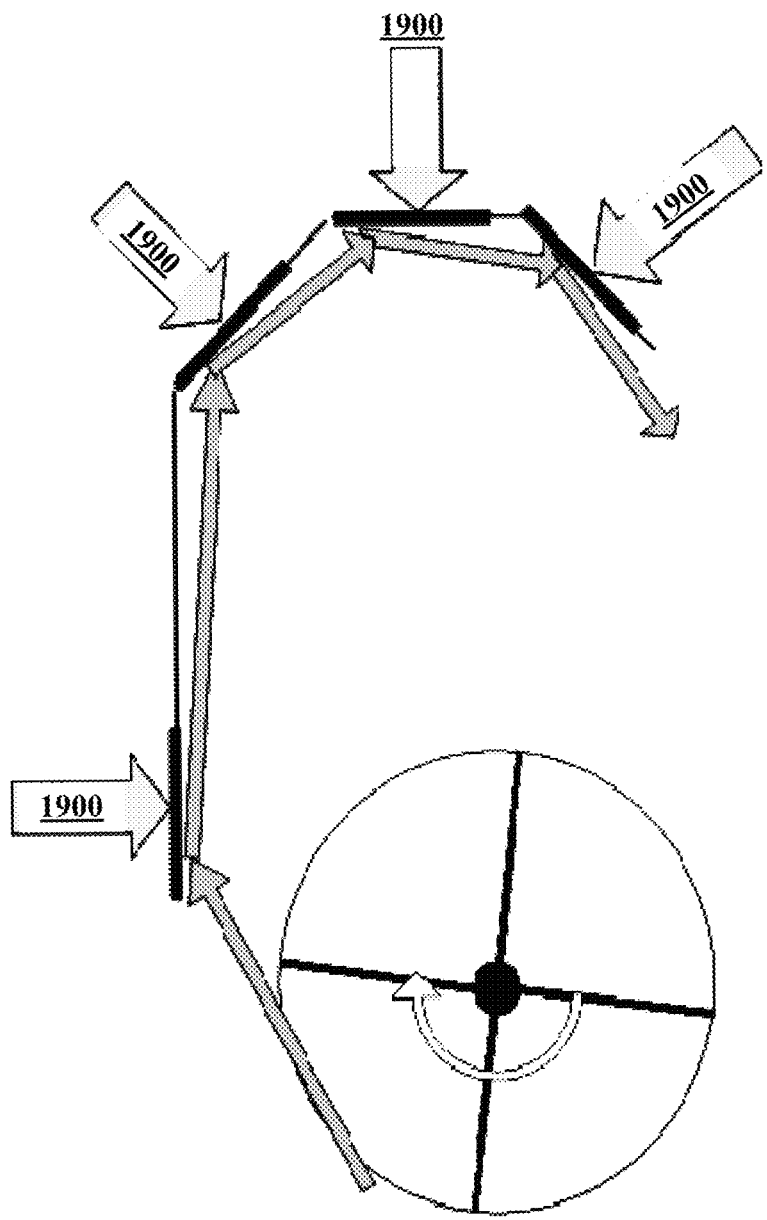
FIG. 19 is a front elevation view showing a direction of travel for corncobs though a discharge spout.

FIG. 19 is a front elevation view showing direction of travel for corn cobs through a discharge spout of a system according to an embodiment. The resulting points of impact 1900 can benefit from surfaces treatments.

Figure 20:
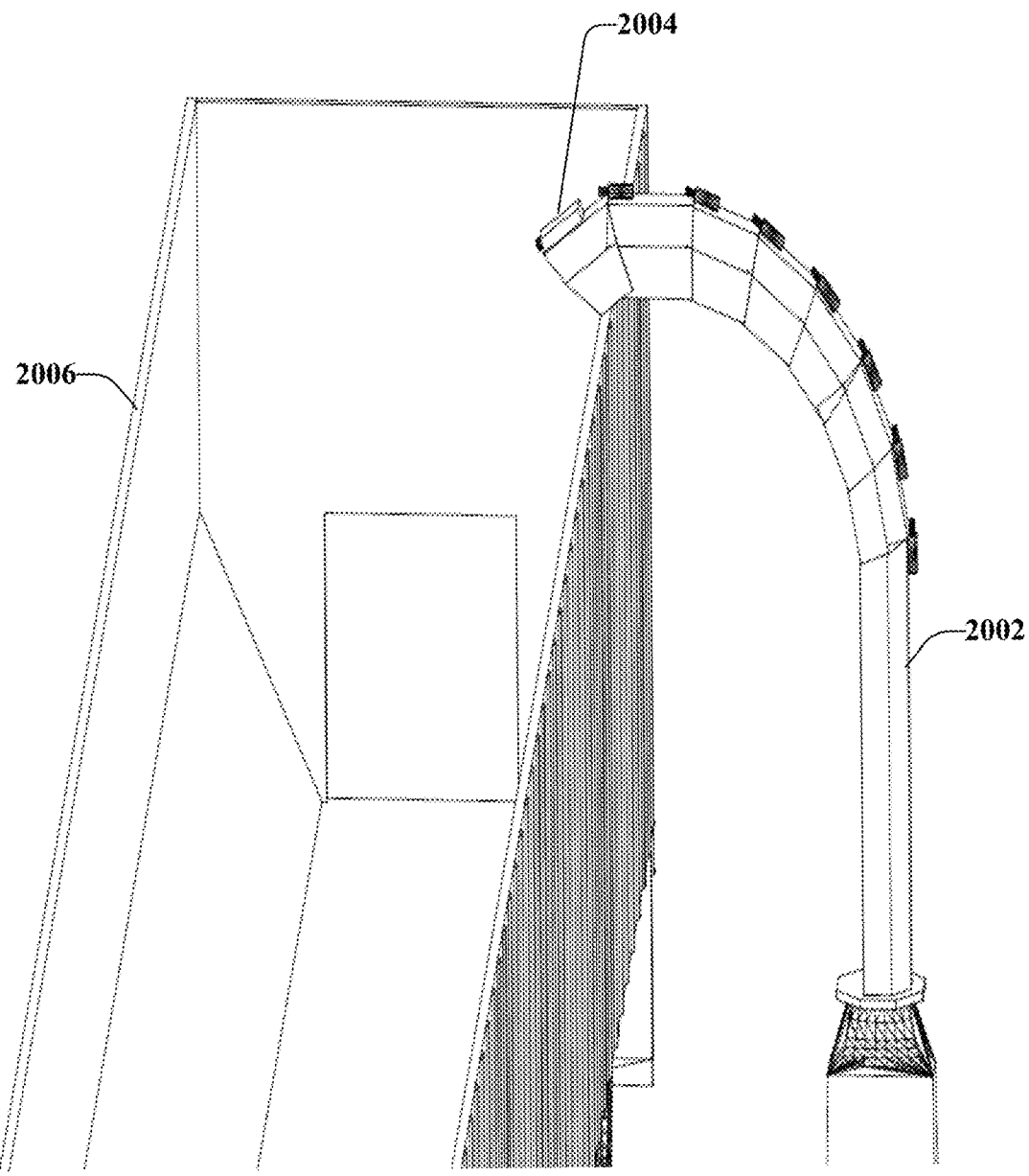
FIG. 20 is a schematic view of a discharge spout that comprises a camera unit.

Because visibility for the operator is limited with tall trailers, one embodiment may incorporate a camera unit to provide visual feedback to the blower operator, visualizing the unload location. FIG. 20 is a schematic view of a discharge spout 2002 that comprises a camera unit 2004 according to an embodiment. Camera unit 2004 can be configured to allow an operator of the system to see the biomass as it is discharged. For example, the operator is able to view the biomass being collected in a trailer 2006 and can selectively move the position or orientation of discharge spout 2002 (or the system) in order to more evenly distribute the load of biomass within the trailer 2006 (or other location).

In accordance with a particularly preferred embodiment, the system can be based on a reconfigured snow blower. For example, a 5 foot extension (or a longer extension) can be added to the discharge spout in order for the discharge spout to be capable of loading into a 13 foot tall trailer. A sufficient RPM level should be maintained in order to mitigate plugging of the discharge spout, which can occasionally occur if the system is overloaded and RPMs started to drop (or are maintained at an insufficient level).

Various adaptations to a snow blower design have been disclosed. The adaptations include, but are not limited to increasing the width of a housing to about 9-12 feet to allow more material to enter the housing at any given time. An adaptation is utilization of rotating breaker bars that operate as an active cutting edge. Another design adaptation is an increase in reach and adjustment (or articulation) of the discharge spout. An adaptation is powering the system with a PTO. Design of rotating blowers to aid in pile clean up and cob flow into the impeller blades has been reconfigured as disclosed. According to other embodiments, the system can be utilized with a front end loader, tractor, or other device.

The word "exemplary" is used to mean serving as an example, instance, or illustration. Any embodiment or design described as "exemplary" is not necessarily to be construed as preferred or advantageous over other embodiments or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

The term "or" is intended to mean an inclusive "or" rather than an exclusive "or." To the extent that the terms "comprises," "has," "contains," and other similar words are used in either the detailed description or the claims, for the avoidance of doubt, such terms are intended to be inclusive in a manner similar to the term "comprising" as an open transition word without precluding any additional or other elements.

It is important to note that the construction and arrangement of the elements of the disclosed subject matter as described in the detailed description and as shown in the figures is illustrative only. Although some embodiments have been described in detail, those skilled in the art who review the disclosure will readily appreciate that many modifications are possible (e.g. variations in size, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be comprised within the scope of the disclosed subject matter. Other substitutions, modifications, changes and omissions may be made in the design, operating conditions and arrangement of the exemplary embodiments without departing from the spirit of the present invention.

What is claimed is:

1. A system, comprising:
    a housing comprising an opening configured for entry of biomass;
    at least one shoe skid configured to offset the housing in a vertical orientation; and
    an apparatus at least partially within the housing and comprising at least one rotating blade assembly, the apparatus is configured to project the biomass entering into the housing through a conduit for collection or transport;
    wherein the housing further comprises a member, the member comprising a first bar comprising a rotating element to dislodge the biomass from a pile for flow into the opening; and
    wherein the conduit is extendable and comprises articulation segments for vertical movement and is configured to discharge the biomass from the housing.

2. The system of claim 1, wherein the conduit is a single discharge spout configured to control a direction of projection for the biomass.

3. The system of claim 1, wherein the conduit comprises internal surface treatments.

4. The system of claim 3, wherein the internal surface treatments comprise low-friction material.

5. The system of claim 3, wherein the internal surface treatments comprise plastic material.

6. The system of claim 1, wherein the rotating element is an auger.

7. The system of claim 1, wherein the housing further comprises:
    a first bar in a substantial horizontal orientation at a top leading edge of the housing; and
    a second bar in a substantial vertical orientation at a side leading edge of the housing.

8. The system of claim 1, wherein the biomass enters the opening axially and is discharged tangentially from the conduit.

9. The system of claim 1, wherein the at least one shoe skid comprises a large surface area and projects forward of the housing.

10. The system of claim 9, wherein the at least one shoe skid is configured to provide a configurable offset between the housing and the ground.

11. The system of claim 1, further comprising a camera system attached to the conduit.

12. The system of claim 1, wherein the system is configured for attachment to a front end loader.

13. The system of claim 1, wherein the system is self-powered.

* * * * *